(12) United States Patent
Ryoo et al.

(10) Patent No.: US 6,599,007 B2
(45) Date of Patent: Jul. 29, 2003

(54) APPARATUS FOR AGITATING ICE CREAM IN AN ICE CREAM VENDING MACHINE

(75) Inventors: To-suck Ryoo, Kwangju (KR); Hong-suk Han, Kwangju (KR)

(73) Assignee: Samsung Kwangju Electronics Co., Ltd., Kwangju (KR)

( * ) Notice: Subject to any disclaimer, the term of this patent is extended or adjusted under 35 U.S.C. 154(b) by 2 days.

(21) Appl. No.: 10/035,862

(22) Filed: Dec. 26, 2001

(65) Prior Publication Data

US 2002/0114212 A1 Aug. 22, 2002

(30) Foreign Application Priority Data

Feb. 16, 2001 (KR) .......................................... 2001-7708
Jul. 26, 2001 (KR) ......................................... 2001-45037

(51) Int. Cl.[7] ................................................. B01F 7/00
(52) U.S. Cl. ..................... 366/292; 366/318; 366/155.2; 366/156.1; 366/158.1; 222/231
(58) Field of Search ................................. 366/292, 318, 366/154.1, 155.1, 155.2, 156.1, 158.4; 222/233, 236, 231

(56) References Cited

U.S. PATENT DOCUMENTS

| | | | | |
|---|---|---|---|---|
| 85,379 A | * | 12/1868 | Going ........................ 222/231 |
| 688,955 A | * | 12/1901 | Kendrick et al. ......... 366/156.1 |
| 1,783,092 A | * | 11/1930 | Lewis .......................... 222/231 |
| 1,791,752 A | * | 2/1931 | Cross .......................... 222/231 |
| 1,812,911 A | * | 7/1931 | Walter ........................ 222/231 |
| 1,960,778 A | * | 5/1934 | Goss et al. .................. 222/231 |
| 2,685,388 A | * | 8/1954 | Steiner ........................ 222/231 |
| 3,895,744 A | * | 7/1975 | Powning ..................... 222/231 |
| 4,195,753 A | * | 4/1980 | Dyer ........................... 222/233 |
| 4,611,921 A | * | 9/1986 | Patel .......................... 366/156.1 |
| 5,372,423 A | * | 12/1994 | Torredeflot .............. 366/152.6 |
| 5,564,329 A | * | 10/1996 | Tomimatsu .............. 366/155.1 |
| 6,389,962 B1 | * | 5/2002 | Han et al. ................ 222/146.6 |

* cited by examiner

*Primary Examiner*—Tony G. Soohoo
(74) *Attorney, Agent, or Firm*—Ladas & Parry

(57) ABSTRACT

An apparatus for agitating ice cream in an ice cream vending machine including a screw member rotatably disposed on an inner lower side of a canister, a worm wheel disposed in contact with an upper end of the screw member, rotatably driven by a rotational movement of the screw member, and an agitating member, a lower end of which contacts the worm wheel, and an upper end positioned at an inner upper side of the canister. The agitating member agitates ice cream particles filled in the upper and lower portions of the canister evenly by being resiliently vibrated upward and downward by rotational movement of the worm wheel. Accordingly, by evenly agitating ice cream particles at upper and lower portions of the canister, the bead-shaped ice cream particles are prevented from attaching to each other.

5 Claims, 4 Drawing Sheets

PRIOR ART

APPARATUS FOR AGITATING ICE CREAM IN AN ICE CREAM VENDING MACHINE

BACKGROUND OF THE INVENTION

1. Field of the Invention

The present invention relates generally to an ice cream vending machine for automatically vending ice cream manufactured in the form of a bead-shaped particle having a diameter approximately between 3 and 7 mm, and more particularly to an apparatus for agitating the ice cream thus preventing the ice cream particles filled in a canister from being attached to each other.

2. Description of the Related Art

As shown in FIG. 1, a general ice cream vending machine includes a refrigerating system 10, a cooling chamber 20 maintained at a low temperature by the operation of the refrigerating system 10, a canister 30 installed within the cooling chamber 20 and filled with a bead-shaped ice cream, a cup feeding device 40 installed outside the cooling chamber 20, which accommodates cups 41 for holding the ice cream, a discharging device 50 for discharging the ice cream filled in the canister 30 to the environment outside the freezing system 10, a chute 60 and a guiding member 70 for guiding the ice cream discharged by the discharging device 50 to the cups 41, and an agitating device 80 for preventing ice cream particles in the canister 30 from attaching to each other.

The refrigerating system 10 is generally known in the refrigerating field, and is used to freeze internal air of the vending machine through a phase change of refrigerant. The air, chilled by the refrigerating system 10, is blown into the cooling chamber 20 by a blower 11.

In the canister 30, bead type ice cream, made in the form of particle having diameter approximately of 3–7 mm, is filled. On a lower end of the canister 30, a discharge port 31 is formed so that the ice cream is discharged therethrough. Meanwhile, in order to maintain the bead shape of the ice cream particles in the canister 30, the cooling chamber 20 is maintained at a temperature approximately between −43° and −27° C.

The ice cream discharging device 50 includes a discharging motor 51 installed on a sidewall of the cooling chamber 20, and a screw member 52 rotatably disposed on a lower end of the canister 30 and rotatably driven by the discharging motor 51 to convey the ice cream particles to the discharging port 31.

The chute 60 is formed on the lower side of the discharging port 31 of the canister 30 to collect the discharged ice cream. The guiding member 70 is disposed on the lower side of the chute 60 to guide the discharged ice cream particles to the cup 41.

The agitating device 80 includes a worm wheel 81 driven by the rotation of the screw member 52 serving as a worm gear, and an agitating member 82 disposed on the upper end of the worm wheel 81 and engages therewith. The agitating member 82 is formed by bending a resilient plate. The agitating member 82 vibrates upward and downward according to the rotational movement of the worm wheel 81, agitating the ice cream particles located at the lower portion of the canister 30.

In the conventional ice cream vending machine constructed as above, when a customer inserts a certain amount of money in the vending machine and presses a selection button (not shown) formed thereon, first, the cup 41 is fed by the cup feeding device 40 to a predetermined position under the guiding member 70. Continuously, by the rotational movement of the screw member 52 caused by the discharging motor 51, the ice cream particles are discharged through the discharging port 31, and piled in the cup 41 through a passage 71 of the chute 60 and the guiding member 70. At this time, the agitating member 82 agitates the ice cream particles piled in the lower portion of the canister 30 by resiliently vibrating upward and downward, thus preventing the attachment of the ice cream particles to each other.

In the conventional ice cream vending machine, however, since the agitating device 80 agitates the ice cream particles piled at the lower portion of the canister 30, which is formed in the proximity of the discharging port 31, it is a problem to prevent attachment of ice cream particles at the upper portion of the canister 30. Accordingly, when the ice cream particles at the upper portion of the canister 30 are attached to each other, an empty space forms in the lower portion of the canister 30 after a certain amount of ice cream particles are discharged out. As a result, in spite of the operation of the discharging motor 51, ice cream particles are not properly discharged.

Further, in the conventional ice cream vending machine, the agitating device 80 operates only during the period discharge of the ice cream particles. Accordingly, problems caused by attachment of ice cream particles are compounded when the ice cream vending machine is not operated for a long period of time, i.e., at night, at dawn, during the winter season, etc.

SUMMARY OF THE INVENTION

The present invention has been made to overcome the above-mentioned problems of the related art, and accordingly, it is an object of the present invention to provide an ice cream agitating device that agitates ice cream particles at the upper and lower portions of a canister.

Another object of the present invention is to provide an agitating device that agitates the ice cream particles at the upper portion of a canister, and agitates the ice cream particles even at times other than during the ice cream discharging operation of an ice cream vending machine.

The above object is accomplished by an apparatus for agitating an ice cream in an ice cream vending machine in accordance with the present invention, including a screw member rotatably disposed on an inner lower side of a canister, a worm wheel disposed in contact with the screw member, which is rotatably driven by a rotational movement of the screw member, and an agitating member, a lower end of which contacts the worm wheel and an upper end positioned at an inner upper side of the canister. The agitating member agitates the ice cream particles found at upper and lower portions of the canister evenly by resilient upward and downward vibration caused by rotational movement of the worm wheel. Preferably, the worm wheel is disposed in engaging contact with an upper end of the screw member, and is rotatably driven by rotational movement of the screw member.

The agitating member is formed by bending a resilient wire approximately into a rectangular shape, the wire having a contacting portion protruding from the lower end of the agitating member so as to contact with the teeth of the worm wheel.

Another object is also accomplished by an apparatus for agitating ice cream in an ice cream vending machine in accordance with the present invention, including a screw member rotatably disposed adjacent an inner lower side of a canister, a worm wheel disposed in engaging contact with the screw member, and rotatably driven by rotational movement of the screw member, a first agitating member disposed such that a lower end thereof is capable of engaging contact with the worm wheel, the first agitating member being resiliently vibrated upward and downward by being driven by the rotational movement of the worm wheel, thereby agitating ice cream particles in a lower portion of the canister, an agitating motor, and a second rotatable agitating member rotatably disposed adjacent the inner upper end of the canister at a predetermined distance from the first agitating member, the second rotatable agitating member being rotatably driven by the agitating motor, for agitating ice cream particles in an upper portion of the canister. Preferably, the worm wheel is disposed in engaging contact with an upper end of the screw member, and is rotatably driven by rotational movement of the screw member.

The rotatable agitating member includes a rotary shaft, one end of which being removably connected to an output shaft of the agitating motor, and a plurality of protruding portions protruding from the rotary shaft in a radial pattern.

According to the present invention, in addition to the agitation of ice cream particles filled in the lower portion of the canister, ice cream particles filled in the upper portion of the canister can also be agitated, the attachment of ice cream particles being thereby prevented throughout the canister.

BRIEF DESCRIPTION OF THE DRAWINGS

The above-mentioned objects and the feature of the present invention will become more apparent by describing the preferred embodiments of the present invention in detail, referring to the appended drawings, in which.

DETAILED DESCRIPTION OF PREFERRED EMBODIMENTS

Figure 1:
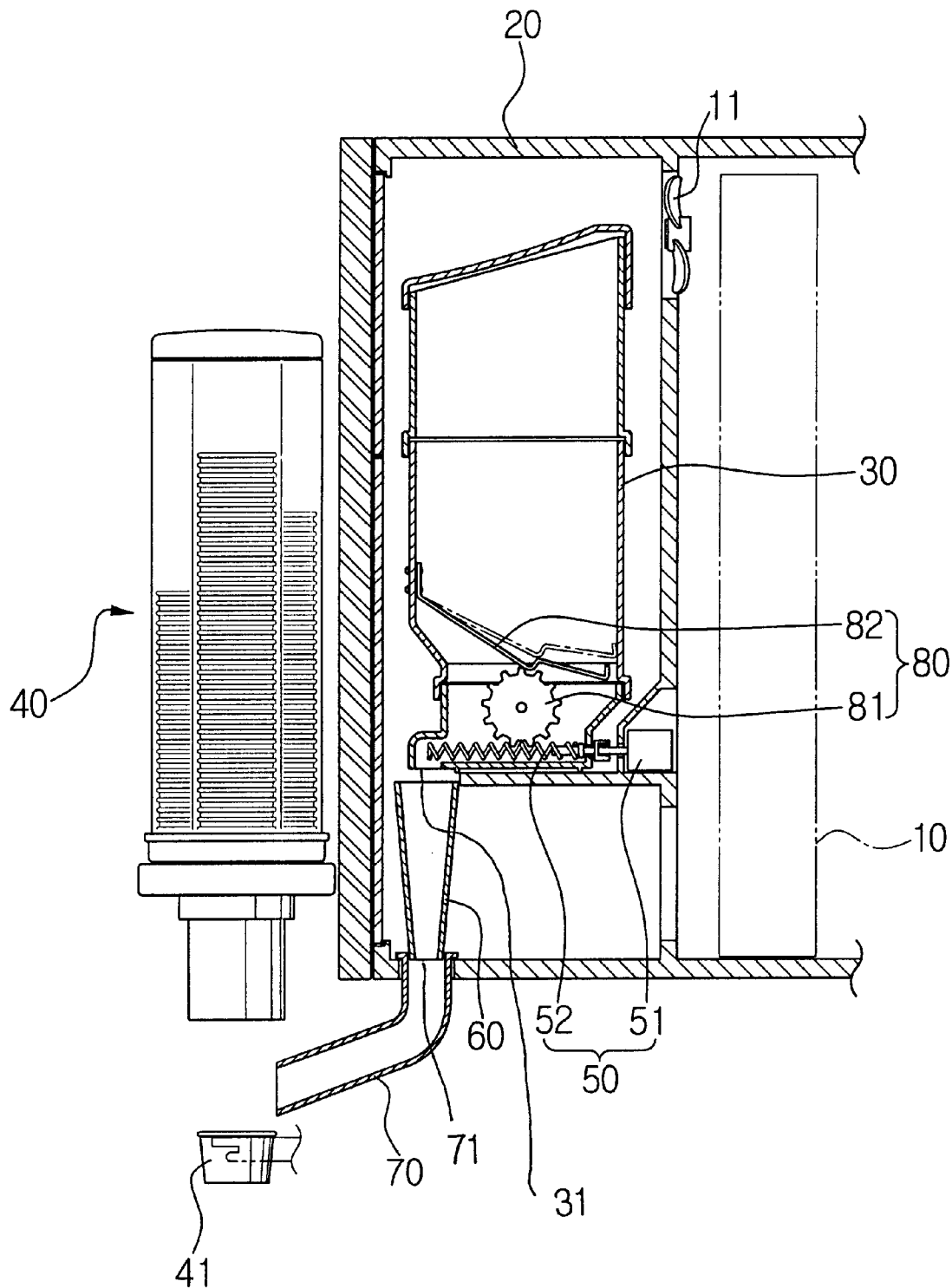
FIG. 1 is a sectional view showing a conventional ice cream vending machine.

Hereinafter, the preferred embodiments of the present invention will be described in greater detail with reference to the accompanying drawing figures. Throughout the description, like elements will be given the same reference numerals as in the conventional ice cream vending machine of FIG. 1, and any redundant description will be omitted.

Figure 2:
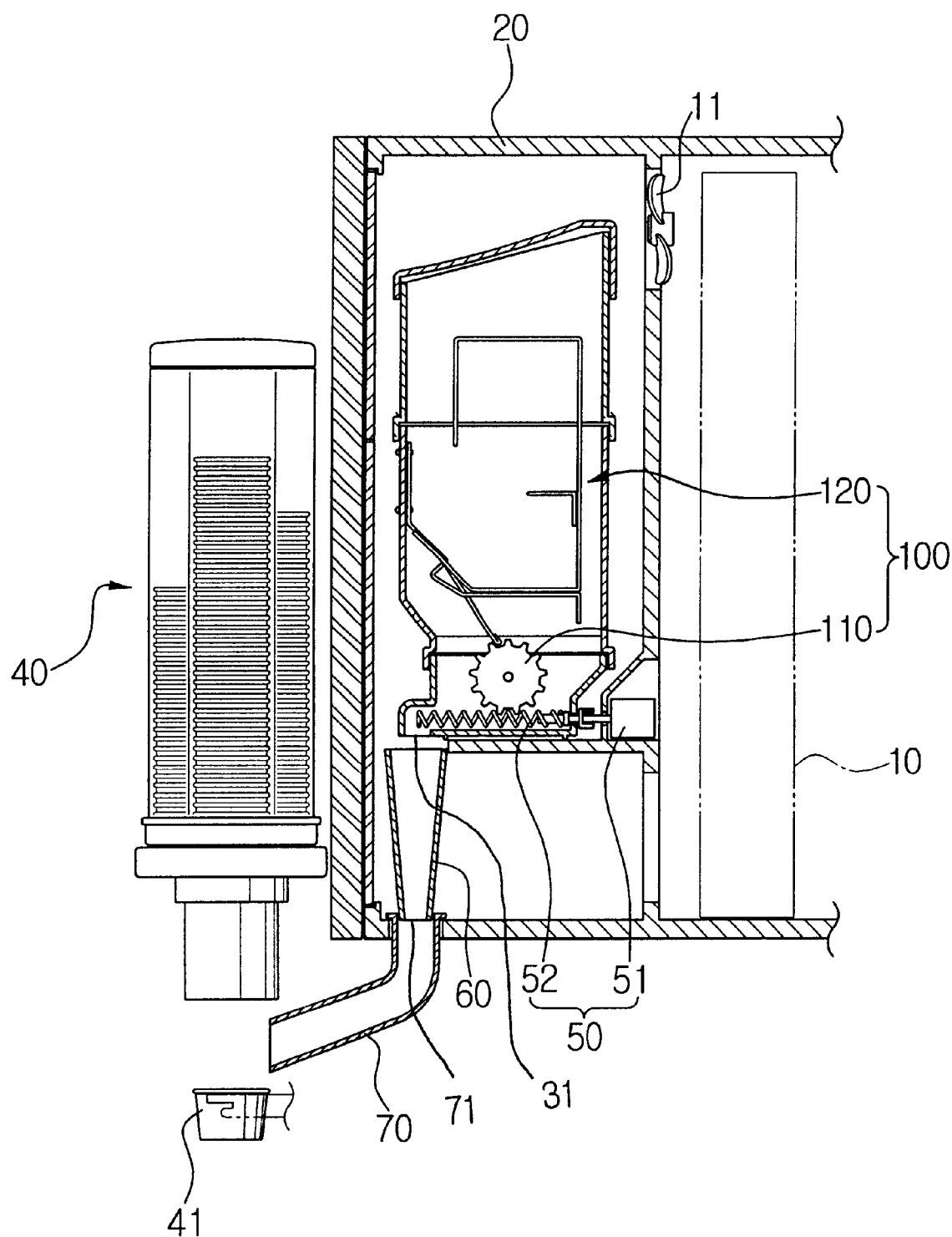
FIG. 2 is a sectional view showing the main feature of an ice cream vending machine having an agitating device in accordance with a first preferred embodiment of the present invention.

FIG. 2 shows an ice cream vending machine having an agitating device in accordance with the first preferred embodiment of the present invention.

As shown in FIG. 2, the ice cream vending machine includes a freezing system 10, a cooling chamber 20 maintained at a low temperature approximately between −43° and −27° C. by the freezing system 10, a canister 30 installed in the cooling chamber 20 and filled with bead-shaped ice cream particles having a diameter approximately between 3 and 7 mm, a cup feeding device 40 disposed on an outside of the cooling chamber 20 and having a plurality of cups 41 for holding ice cream particles therein, a discharging device 50 for discharging the ice cream particles filled in the canister 30 outside of the canister 30, a chute 60 and a guiding member 70 for guiding the ice cream particles discharged by the discharging device 50 into the cups 41, and an agitating device 100 for preventing the ice cream particles of the canister 30 from attaching to each other.

The ice cream discharging device 50 includes a discharging motor 51 installed on a sidewall of the cooling chamber 20, and a screw member 52 rotatably disposed on a lower end of the canister 30 and rotatably driven by the discharging motor 51 to convey the ice cream particles to the discharging port 31.

The agitating device 10 includes a worm wheel 110 rotatably driven by the rotational movement of the screw member 52 serving as a worm gear, and an agitating member 120 disposed above the worm wheel 110 and in engaging contact therewith.

Figure 3:
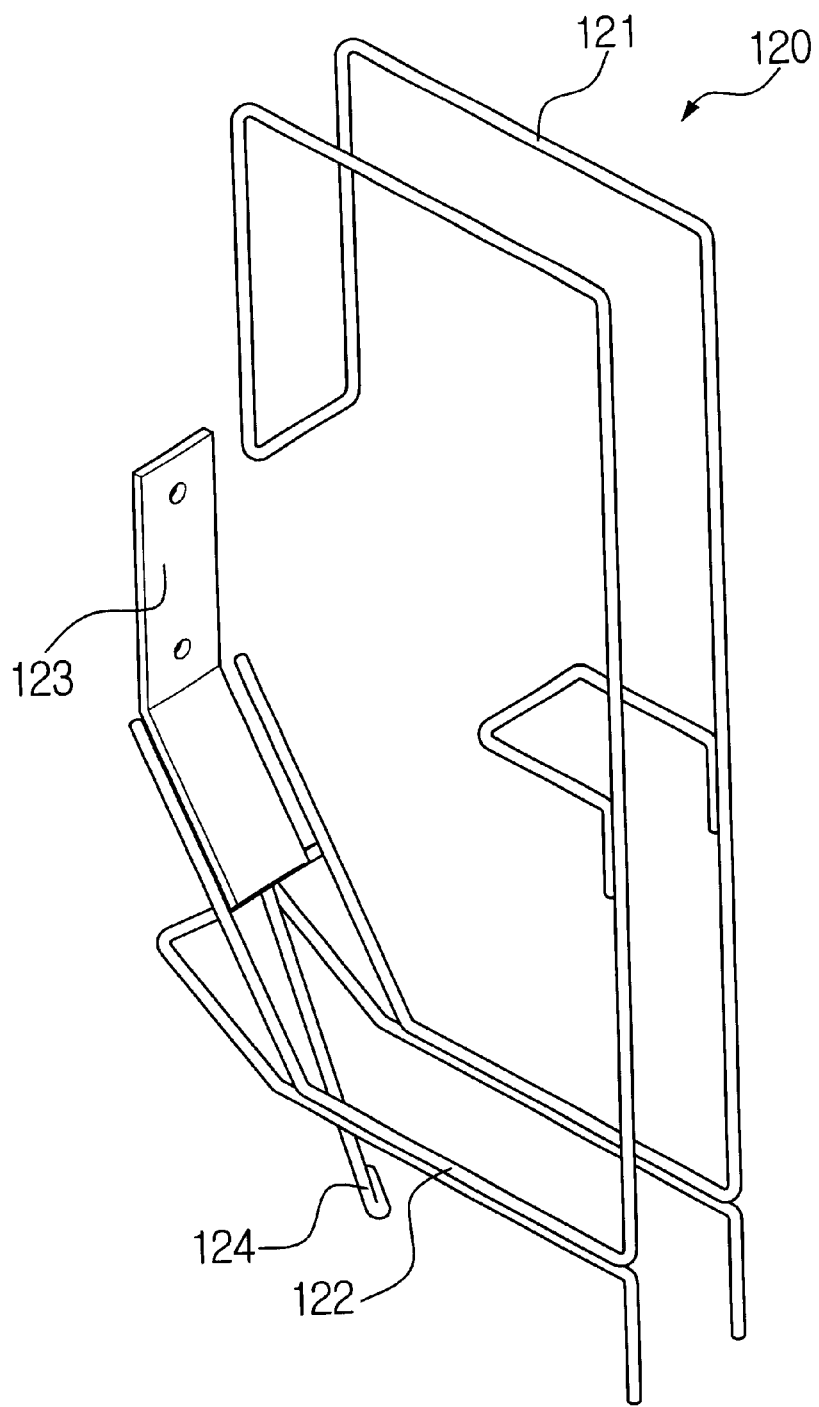
FIG. 3 is a perspective detailed view, showing the agitating member separated from the agitating device of FIG. 2.

As shown in FIG. 3, the agitating member 120 is formed by bending a resilient wire into approximately a rectangular shape. The agitating member 120 is disposed on a sidewall of the canister 30 by a mounting portion 123 in a manner that an upper end 121 is positioned adjacent an upper portion of the canister 30 and a lower end 122 is positioned adjacent a lower portion of the canister 30. From the lower end 122 of the agitating member 120, a contact portion 124 protrudes in an inclined manner to contact with the teeth of the worm wheel 110. The agitating member 120 vibrates upward and downward by the rotational movement of the worm wheel 110, thereby agitating the ice cream particles in the canister 30.

In the inventive ice cream vending machine constructed as above, the ice cream discharge device operates as follows. When a customer inserts a certain amount of money and presses a selection button (not shown), a cup 41 is fed to a certain position at the lower side of the guiding member 70 by the cup feeding device 40. Continuously, the screw member 52 is rotatably driven by the discharging motor 51, and ice cream particles are discharged through the discharging port 31 formed at a lower end of the canister 30. Then the ice cream particles are piled in the cup 41 after passing through the chute 60 and the guiding member 70.

Meanwhile, by the rotational movement of the screw member 52, the worm wheel 110 is also rotated and accordingly, the contact portion 124 of the agitating member 120 vibrates by intermittently contacting with the teeth of the worm wheel 110. Accordingly, the upper end 121 and the lower end 122 of the agitating member 120 vibrate upward and downward, evenly agitating the ice cream particles piled at upper and lower portions of the canister 30 and thus preventing attachment of ice cream particles to each other.

Figure 4:
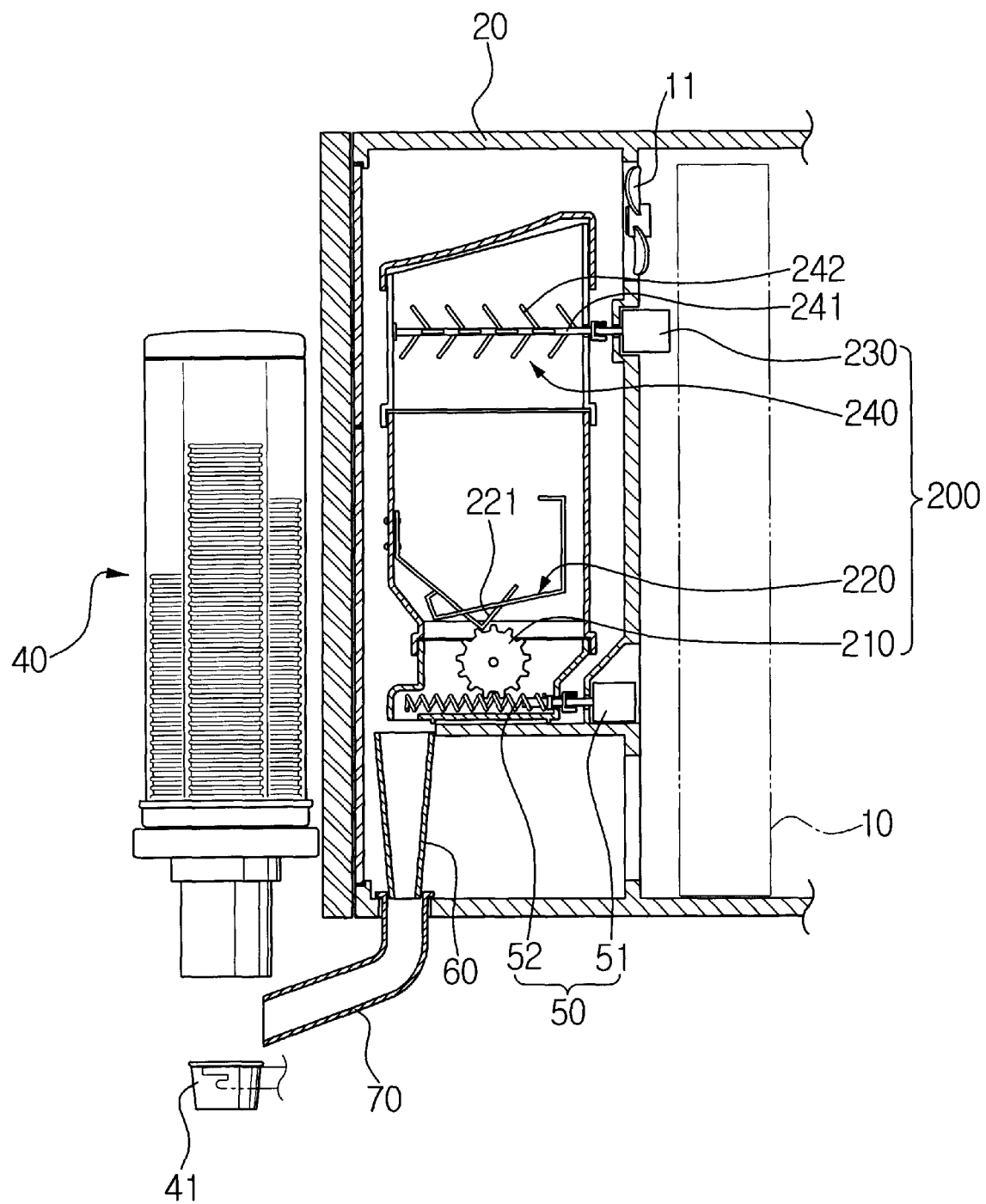
FIG. 4 is a sectional view showing the main feature of the ice cream vending machine having the agitating device in accordance with a second preferred embodiment of the present invention.

FIG. 4 shows the ice cream vending machine having the agitating device in accordance with the second preferred embodiment of the present invention. The ice cream vending machine of FIG. 4 is almost identical to the ice cream vending machine of FIG. 2, except for the construction of the agitating device. Accordingly, any redundant description will be omitted, and the agitating device will be described below.

As shown in FIG. 4, an agitating device 200, according to the second preferred embodiment, includes a worm wheel 210 rotatably driven by the rotational movement of the screw member 52 that serves as a worm gear rotatably driven by the discharging motor 51, an agitating member disposed adjacent the upper end of the worm wheel 210 in engaging contact therewith, vibrating upward and downward according to the rotational movement of the worm wheel 210, an agitating motor 230 installed adjacent an upper portion of the sidewall of the cooling chamber 20, and a rotatable agitating member 240 rotatably disposed adjacent an inner upper side of the canister 30 at a predetermined distance from the agitating member 220 and is rotated by the agitating motor 230.

The agitating member 220 is formed of a resilient wire, and has a bending portion 221 formed on the lower end thereof for engaging contact with the teeth of the worm wheel 210. When the worm wheel 210 is rotated, the agitating member 220 vibrates upward and downward as the bending portion 221 intermittently comes into contact with the teeth of the worm wheel 210.

The rotatable agitating member 240 includes a rotary shaft 241 having one end removably connected to an output shaft of the agitating motor 230 and the other end rotatably supported on the sidewall of the canister 30, and a plurality of protruding portions 242 protruding from the rotary shaft 241 in a radial pattern.

In the agitating device 200 constructed as above, when the screw member 52 and the worm wheel 210 are rotated by the operation of the discharging motor 51, the agitating member 220 vibrates upward and downward, agitating the ice cream particles filled in the lower portion of the canister 30. Also, as the rotatable agitating member 240 is rotated by the operation of the agitating motor 230, the ice cream particles in the upper portion of the canister 30 are also agitated.

Meanwhile, at dawn, or when ice cream is out of season, i.e., when the frequency of ice cream vending operation decreases significantly, the ice cream particles of the canister 30 still can be agitated by the rotatable agitating member 220, by the controlling portion (not shown) of the vending machine, which controls the operation of the agitating motor 230.

As described above, the agitating device 100, in accordance with the first preferred embodiment of the present invention (FIGS. 2 and 3), the upper end 121 of the agitating member 120 is positioned at the upper portion of the canister 30, while the lower end 122 of the agitating member 120 is positioned at the lower portion of the canister 30. The ice cream particles filled in upper and lower portions of the canister 30 are thus evenly agitated, and the attachment of the ice cream particles to each other is prevented throughout the device.

Meanwhile, the agitating device 200 (FIG. 4), in accordance with the second preferred embodiment of the present invention, has an agitating member 220 positioned at the lower portion of the canister 30, while the rotatable agitating member 240 is positioned at the upper portion of the canister 30 Accordingly, the ice cream particles found at upper and lower portions of the canister 30 can be agitated evenly. Furthermore, the agitating device 200, in accordance with the second preferred embodiment of the present invention, has an agitating member 220 and rotatable agitating member 240 which are driven separately by the discharging motor 51 and the agitating motor 130, respectively. The ice cream particles are agitated by driving the rotatable agitating member 240 even when the frequency of vending of ice cream falls off, i.e., at dawn, when the ice cream is out of season, or the like.

Although the preferred embodiments of the present invention have been described, it will be understood by those skilled in the art that the present invention should not be limited to the described preferred embodiments, but various changes and modifications can be made so as to remain within the spirit and scope of the present invention, as defined by the appended claims.

What is claimed is:

1. An apparatus for agitating ice cream in an ice cream vending machine, comprising:
   a screw member rotatably disposed on an inner lower side of a canister;
   a worm wheel disposed in engaging contact with the screw member, and rotatably driven by rotational movement of the screw member; and
   an agitating member, comprising a resilient wire shaped in approximately a rectangular shape, and having a contact portion protruding from the a lower end of the agitating member for providing contact with teeth of the worm wheel, and an upper end positioned adjacent an inner upper side of the canister, the agitating member agitating ice cream particles filled in the upper and lower portions of the canister evenly by being resiliently vibrated upward and downward by rotational movement of the worm wheel.

2. The apparatus for agitating ice cream of claim 1, wherein the worm wheel is disposed in engaging contact with an upper part of the screw member, and being rotatably driven by the rotational movement of the screw member.

3. An apparatus for agitating ice cream in an ice cream vending machine, comprising:
   a screw member rotatably disposed adjacent an inner lower side of a canister;
   a worm wheel disposed in engaging contact with the screw member, and rotatably driven by the rotational movement of the screw member;
   a first agitating member disposed such that a lower end thereof contacts the worm wheel, the first agitating member being resiliently vibrated upward and downward by being driven by rotational movement of the worm wheel, thereby agitating ice cream particles in the lower portion of the canister;
   an agitating motor; and
   a second rotatable agitating member rotatably disposed in the inner upper side of the canister at a predetermined distance from the agitating member, the second rotatable agitating member being rotatably driven by the agitating motor, for agitating ice cream particles in the upper portion of the canister.

4. The apparatus for agitating ice cream of claim 3, wherein the second rotatable agitating member comprises:
   a rotary shaft, one end of which is removably connected to an output shaft of the agitating motor; and
   a plurality of protruding portions protruding from the rotary shaft in a radial pattern.

5. The apparatus for agitating ice cream of claim 3, wherein the worm wheel is disposed in engaging contact with an upper part of the screw member, and being rotatably driven by the rotational movement of the screw member.

* * * * *